US009966066B1

(12) United States Patent
Corfield et al.

(10) Patent No.: US 9,966,066 B1
(45) Date of Patent: May 8, 2018

(54) SYSTEM AND METHODS FOR COMBINING FINITE STATE TRANSDUCER BASED SPEECH RECOGNIZERS

(71) Applicant: nVoq Incorporated, Boulder, CO (US)

(72) Inventors: Charles Corfield, Boulder, CO (US); Michael Clark, Boulder, CO (US); Adam Ornstein, Boulder, CO (US); Stephen Bulick, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 0 days. days.

(21) Appl. No.: 15/411,747

(22) Filed: Jan. 20, 2017

Related U.S. Application Data

(60) Provisional application No. 62/290,888, filed on Feb. 3, 2016.

(51) Int. Cl.
*G10L 15/193* (2013.01)
*G10L 15/14* (2006.01)
*G10L 15/02* (2006.01)

(52) U.S. Cl.
CPC .......... *G10L 15/193* (2013.01); *G10L 15/02* (2013.01); *G10L 15/142* (2013.01); *G10L 2015/025* (2013.01)

(58) Field of Classification Search
CPC ............... G10L 15/146; G10L 15/193; G10L 2015/0635
USPC ................ 704/231, 244, 256.3, 243, 256.5
See application file for complete search history.

(56) References Cited

U.S. PATENT DOCUMENTS

| | | | | |
|---|---|---|---|---|
| 6,574,597 B1 * | 6/2003 | Mohri | ................... | G10L 15/183 704/251 |
| 8,214,212 B2 * | 7/2012 | Bangalore | ............... | G10L 15/24 704/243 |
| 8,255,220 B2 * | 8/2012 | Cho | ........ | G10L 15/193 704/257 |
| 9,396,724 B2 * | 7/2016 | Rao | ........................ | G10L 15/063 |
| 9,396,726 B2 * | 7/2016 | Corfield | ................. | G10L 15/183 |
| 9,704,482 B2 * | 7/2017 | Kingsbury | ............ | G10L 15/193 |
| 9,734,823 B2 * | 8/2017 | Kingsbury | ............ | G10L 15/083 |
| 2005/0149888 A1 * | 7/2005 | Gunawardana | ...... | G06F 17/2755 704/238 |
| 2008/0243484 A1 * | 10/2008 | Mohri | .................. | G06F 17/2775 704/9 |
| 2012/0046939 A1 * | 2/2012 | Mohri | .................. | G06F 17/2775 704/9 |
| 2016/0155440 A1 * | 6/2016 | Nagao | .................... | G10L 15/193 704/256.4 |
| 2016/0284348 A1 * | 9/2016 | Yu | ........................... | G10L 15/16 |

(Continued)

OTHER PUBLICATIONS

Mirko Hannemann, "Weighted Finite State Transducers in Automatic Speech Recognition", Oct. 4, 2013, 46 Pages.*

(Continued)

*Primary Examiner* — Martin Lerner
(74) *Attorney, Agent, or Firm* — Perkins Coie LLP

(57) ABSTRACT

A speech recognition engine is provided. The speech recognition engine combines multiple, different statistical language models to allow a single instance of a speech recognition engine to recognize words applicable to a first group of users and a second group of users where the second group of users is a subset of the first group of users. At least one of the multiple, different statistical language models comprises words specific to the second group of users.

19 Claims, 7 Drawing Sheets

(56) References Cited

U.S. PATENT DOCUMENTS

2016/0300566 A1* 10/2016 Hofer ................. G10L 15/08
2017/0125012 A1* 5/2017 Kanthak ............. G10L 15/063

OTHER PUBLICATIONS

Mohri et al., "Speech Recognition with Weighted Finite-State Transducers", Springer Handbook on Speech Processing and Speech Communication, Springer 2008, pp. 1 to 31.*

Stoimenov et al., "A Multiplatform Speech Recognition Decoder Based on Weighted Finite-State Transducers", 2009 IEEE Workshop on Automatic Speech Recognition and Understanding (ASRU 2009), Nov. 2009, pp. 293 to 298.*

Miao et al., "EESEN: End-to-End Speech Recognition Using Deep RNN Models and WFST-Based Decoding", 2015 IEEE Workshop on Automatic Speech Recognition and Understanding (ASRU 2015), Oct. 18, 2015, pp. 167-174.*

* cited by examiner

SYSTEM AND METHODS FOR COMBINING FINITE STATE TRANSDUCER BASED SPEECH RECOGNIZERS

CROSS-REFERENCE TO RELATED PATENT APPLICATIONS

This application claims priority to U.S. Provisional Patent Application Ser. No. 62/290,888, filed Feb. 3, 2016, which application is incorporated herein by reference as if set out in full.

BACKGROUND

In the last few years Large Vocabulary Continuous Speech Recognition (LVCSR) has improved to the point where it is more or less speaker independent. For example, Apple, Google and Microsoft have deployed speech recognition systems to transcribe voice mail, provide driving directions, act as personal assistants, and such like. The focus has been to create systems which work acceptably for a large number of users (consumers), who are willing to tolerate some errors in exchange for the convenience of speaking rather than manual entry via keyboards and touch screens.

Due to the requirement that systems work "well enough" for millions of users, the focus has been on raising the average accuracy across many users, rather than the accuracy for one particular user. Well enough in the context of the present application means an acceptable level of accuracy (typically below 100%) for a majority of the consumers. For example, well enough may in certain instances include an accuracy of 85% word/sentence recognition which is acceptable for 90% of the consumers. To capture 80% of the consumers, for example, an accuracy of 80% may be sufficient and to capture 95% of the consumers, an accuracy of 97% may be required. The percentages are exemplary only and not intended to be limiting.

Consumer grade systems do not work so well for professionals, since they lack domain specific vocabulary and phraseology, and thus would either have too high an error rate, or not return text with the requisite formatting (capitalization, abbreviations, symbols, and the like). In certain aspects, consumer grade systems do not have the appropriate lexicon or words that the professionals use as the corpus of material used to generate the models do not exist. Professionals usually have very high unit labor costs, and it does not make economic sense for them to fix recognition and formatting errors—they would be better off sending the whole job to an offshore transcriptionist, whose labor rate is (typically) a small fraction of the professional's. Professionals tend to have specialized phraseology and vocabulary, which is important to them, but is of limited or no utility to a wider audience. Thus, it would be desirable to provide speech recognition which has been customized to recognize their specific vocabulary and phraseology, without deploying it to other users where it may create confusion if unexpected words/phrases appear in their recognition results.

An example of specialized vocabulary is a medical professional who wishes to use the terminology of the International Classification of Disease from the World Health Organization, of which the tenth edition is currently being implemented, (hereinafter ICD10 terminology) when documenting her patient consultations, so that she can be compensated for the services actually rendered. In similar vein, a customer care agent may wish to use product or service specific language when documenting a particular customer's issues during a call, chat, or e-mail. Similarly, accountants may have standard vocabulary of recording generally accepted accounting principles (GAAP) or the like. Other industries that have user specific language may include lawyers (such as for example this patent application), mechanics for particular car models, etc.

Previous generations of speech recognition, such as those developed by Microsoft, Nuance, SRI, BBN, and others, have had their own proprietary ways to allow users to include new words (and their pronunciation) and to extend the language modeling to reinforce recognition of particular phrases or combinations of words. An oft repeated cycle in technology is that innovations which begin as proprietary implementations later emerge as open source distributions. Speech recognition is no exception. In the last few years we have seen the emergence of open source systems using neural nets and finite state transducers. For instance, the Kaldi open source speech recognition project can be found at kaldi-asr.org. Similarly, Carnegie Mellon University has maintained an open source recognizer "Sphinx" (cmusphinx.sourceforge.net) for many years. These newer systems are superior to their predecessors in both public and proprietary domains, although they have been aimed mainly at researchers and not so much at commercial applications. Although the technology components have changed over the years, the basic order of operations ("phases") in recognition remains the same: there is an initial acoustic analysis, followed by a first pass decoding to produce a list of candidate transcriptions, followed by second pass of rescoring to determine the best transcription.

Based on the above, it is desirable to be able to combine a general purpose recognizer with a domain specific one on a user-by-user basis. The technology of the present application focuses on how to customize a recognition system which uses Finite State Transducers (FSTs) in its decoding and/or rescoring phases by combining separate FSTs, each of which handles a different recognition and/or rescoring scenario. One application is to enable an end user (or customer as described above) to leverage the benefits of both a general purpose recognition system catering to a group of similarly situated users, as well as user specific vocabulary and phraseology which may only be of value to that one user and no one else or a limited number of end users.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 a schematic view of a finite state transducer representative of a statistical language model consistent with the technology of the present application.

DETAILED DESCRIPTION

Figure 1:
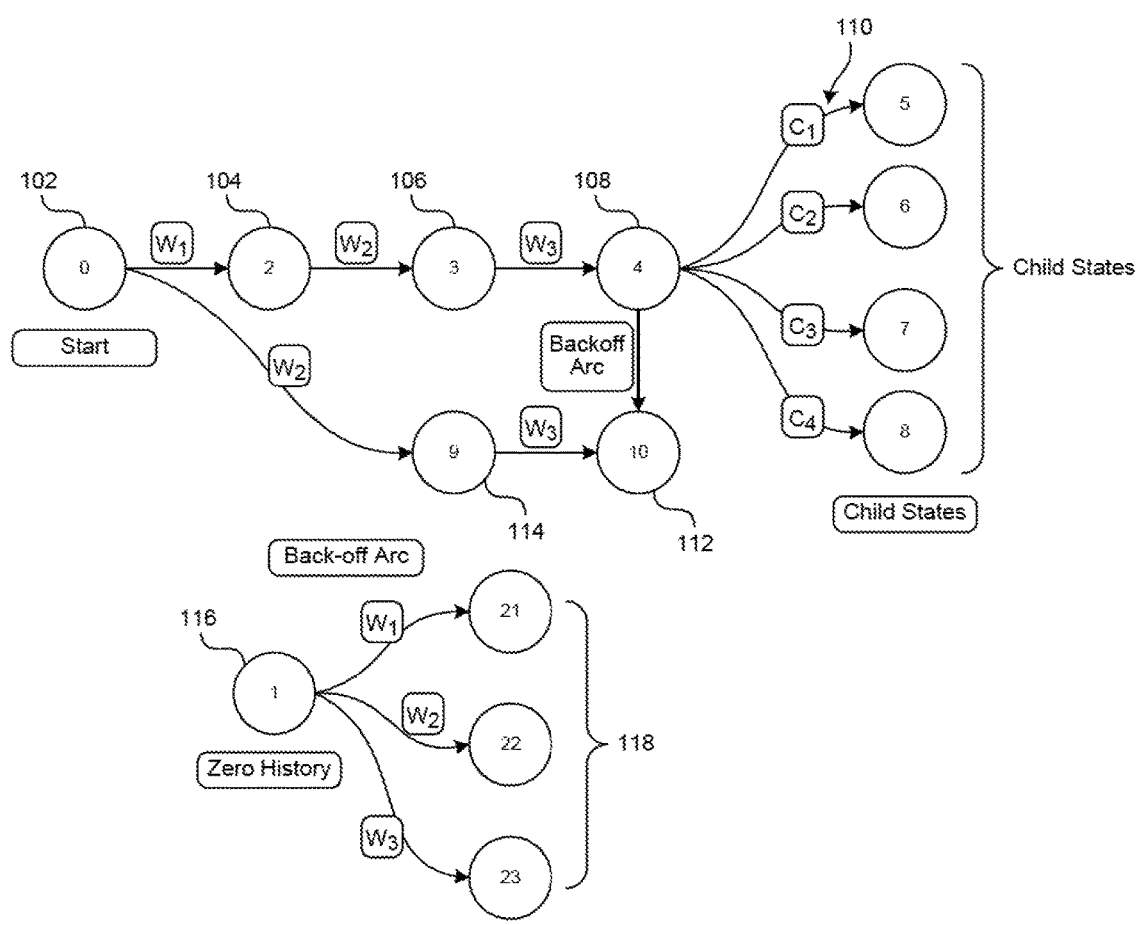

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

By way of background, recognizer and rescore FSTs for a general use LVCSR may be many gigabytes in size and take many hours of CPU time to create. As such, it is not practical to create and store a new, one-off decoder/recognizer for each user (or a limited group of users) and user-specific word that a user (or limited group of users) wants the LVCSR system to recognize. The technology of the present application provides technical solutions and an approach to joining recognizer and rescoring FSTs in an on-demand, real-time fashion.

Finite State Transducers are machines that map input token sequences to output token sequences and calculate an associated cost, weight, or probability for the transaction. Cost, weight, and probability are mathematically equivalent, but the specific calculation relates to the particular use case to which an FST is applied, and whether it is more natural to refer to it as a "cost", "probability", "log probability", "weight", or some other domain-specific value.

At least for the purposes of the technology described herein, FSTs may be thought of as a combination of two games: "scavenger hunt" and "snakes and ladders". Imagine being given slips of paper on which are written your clues when you enter a labyrinth. At each junction in the labyrinth you look for a way forward which matches the next clue; occasionally you hit a snake or ladder which takes you instantaneously to another location in the labyrinth without using up a clue. Along the way you find tokens and pages from a book which you pick up and keep. Eventually, you find an exit and you are finished. In your possession are the tokens and story you picked up en route. Not all paths through the labyrinth are successful—you may have to back track (giving up tokens and story fragments) and try alternative routes (in which case, you collect new tokens and story pages). In FST parlance, the snakes and ladders are "epsilon transitions", and the exit points are "final states". A classic problem in FSTs is to find the path (or paths) through the labyrinth with the highest payout, or (equivalently) highest/lowest cost, highest/lowest probability, and such or the like. FSTs are used to model problems where there are many possible solutions and you wish to find the best one(s).

In speech recognition, the input sequence to a decoder FST may consist of phonemes or sub-phonemes (hereafter referred to as phonemes), and the output sequence may consist of words, and their calculated probability. Phonemes are atomic units of pronunciation and are the verbal equivalent of a written alphabet. In the same way that all English words can be spelled using 26 letters of the English alphabet, so all English words can be pronounced using a set of approximately 40 phonemes.

Since we are using computers rather than humans to interpret the audio and turn it into words, we can use a finer grained set of phonemes, which may have several thousand members, which the computer has been trained to identify. The actual number of phonemes, or sub-phonemes, does not matter, as the computer training algorithms will adapt themselves to whatever phoneme set is specified. Phonemes have variable durations, which means a recognition system has to consider many different ways a given sequence of words can be enunciated with varying lengths of individual phonemes. Additionally, it is not known, a priori, what words were said to produce a given audio signal.

From all the possible word sequences and possible durations of phonemes, the speech recognition system searches for the word sequence(s) and phoneme-to-audio-frame alignment(s) which best matches the acoustic signal. A common technique in speech recognition is to perform two recognition passes. The output of the first pass is a collection of word sequences which the engine judges to be the closest matches to the audio signal. The decoder used in the first pass is often optimized to produce its list of N-best candidate word sequences as quickly as possible, and then a second pass is done to evaluate these N-best candidates according to some other information source, which may be a high order statistical language model or a neural net, or a combination of the two. The exact form this second pass takes is less important than the fact that other information can be brought to bear on the N-best list generated by the first pass and a "winning" word sequence chosen. In this disclosure we focus on the cases where FSTs are used in the first-pass decoding, as well as the second-pass 'rescoring'.

Speech recognition systems, which use FSTs, divide the first pass decoding into sub tasks, each of which is implemented using an FST. The following description illustrates one exemplary approach, although the technology of the present application is equally applicable to other approaches. The exemplary approach using FSTs described herein is applicable to the Kaldi open source speech recognition project which is the Kaldi project referenced above.

The details of the FSTs approach, which are generally known in the industry, will not be completely explained in detail, but will be explained sufficiently to understand the technology of the present application. In this application, the decoding process is broken down into four phases: (a) translation from Markov states (aka transitions) to context dependent phonemes, this sub-task is implemented by an FST called "H.fst" (H stands for "Hidden Markov Model"); (b) translation from context dependent phonemes to dictionary phonemes, this sub-task is implemented by an FST called "C.fst"; (c) translation from dictionary phonemes to words, this sub-task is implemented by an FST called "L.fst" (L stands for "Lexicon"); (d) translation from words to word-sequences which are scored for overall likelihood by a language model, this sub-task is implemented by an FST called "G.fst" (G stands for "Grammar"). By way of reference, Context dependent phonemes are a refinement on dictionary phonemes, which acknowledge that the pronunciation of an individual phoneme is influenced by the phonemes that come before and after it as well as whether the phoneme is at the beginning, in the middle, or at the end of a word, or stand-alone.

The H.fst encapsulates the variability of phoneme duration. The time duration of phonemes is influenced by many factors, such as, pace of speech, nearby phonemes, quality of enunciation (drunkard vs. news-anchor), rhythm of nearby words, and so on. There are three Markov states for each phoneme, which can be thought of as representing the "beginning", "middle", and "end" phases of the phoneme (or sub-phoneme). At each time step (typically 10 msecs), you can either stay in the current Markov State, or move to the next one. Typically, the probability of staying in the current Markov state is high (close to one), with a lower probability that you move to the next Markov state. The higher the probability of staying in the same Markov state, the longer (more audio frames) a phoneme is expected to last. The H.fst has loops from each Markov state to itself (self-loops) which embody the tendency to stay in the same Markov state for many frames of audio. The outputs of the H.fst are context dependent phonemes, so that the H.fst converts a sequence of Markov states to a sequence of context dependent phonemes and calculates their probability (using pre-calculated Markov transition probabilities).

The C.fst performs a one for one mapping from context dependent phonemes to their dictionary equivalents (it does not calculate any probabilities). One for one mapping means that every context dependent phoneme maps to one, and only one, dictionary phoneme. However, several context dependent phonemes may map to the same dictionary phoneme. Similarly, the L.fst converts sequences of dictionary phonemes to the words they pronounce (usually without calculating any probabilities, but occasionally it is desirable to consider the relative probabilities of different pronunciations of a word).

One way to view the recognition process is that an audio analyzer provides a snapshot every 10 msecs (a typical value, and the snapshot time duration is exemplary for understanding and should not be considered limiting) characterizing how well the audio matches each Markov state. We expect the Markov states associated with the phoneme the user is actually saying to score the highest, while Markov states associated with distant phonemes score the lowest. As the frames go by we can imagine collecting a sequence of high scoring Markov states, which H.fst converts to a sequence of context dependent phonemes, which are converted by C.fst to a sequence of dictionary phonemes, which are converted by L.fst into a sequence of words, which G.fst scores for their match to the language model, which consists of word sequences derived from a text corpus.

Although it is easiest to understand recognition systems bottom-up, which is as just described above, they actually work top-down, and start from candidate sequences of words and calculate the likelihood that the audio signal could have been generated by someone speaking those words and, separately, how well that sequence of words matches the supplied language model. Since there are many possible permutations of how long the phonemes last for a given word sequence spoken in a given time duration, recognition engines have efficient search algorithms to determine an alignment of phonemes to frames which yields the best match (or highest probability).

As can now be appreciated, FSTs can be combined together: a first FST maps a first set of input tokens to a first set of output tokens, which are the input tokens to a second FST, which converts them to a second set of output tokens, which are then the input tokens to a third FST, and so on. The combination of two, or more, FSTs applied serially is equivalent to a single FST which translates sequences of tokens which are the inputs to the first FST into sequences of tokens which are the output tokens from the last FST in the series. The operation which combines multiple FSTs into a single FST is called "composition". In similar fashion the costs, probabilities, or weights calculated by the individual FSTs are rolled up into an equivalent calculation by the composed FST.

In speech recognition, we can combine the four FSTs mentioned above (H.fst, C.fst, L.fst, and G.fst) into one FST, called HCLG.fst, which converts sequences of Markov states to sequences of words and their associated likelihoods. Note that the likelihoods calculated by the HCLG.fst are typically a combination of the likelihoods calculated by the H.fst and the G.fst (in the normal course, the C.fst and L.fst simply translate inputs to outputs and don't do any calculations).

The Markov states which comprise the input sequence to the HCLG.fst are provided by an audio analyzer, which considers a moving window, typically 25 msecs wide, stepped along in 10 msec increments (although the 25 msec window and 10 msec increments are exemplary and not intended to be limiting). The audio analyzer calculates for each window a vector of likelihoods: one entry for each Markov state, and each entry contains the likelihood that the associated window of audio could have come from that Markov state. Markov states which correspond to the actual phoneme being spoken get high scores, and states which correspond to distant phonemes get low scores. For a given sequence of words and alignments of their phonemes to the audio frames, the audio analyzer provides the probability that the audio signal under consideration could have been generated by that sequence. Since there are many possible alignments for a given word sequence, the alignment with the highest probability score is considered to be the "acoustic probability" of the word sequence.

Returning to our scavenger hunt analogy, the HCLG.fst may be considered a labyrinth where the clues are a sequence of Markov states (recall that they represent the beginnings, middles, and ends of phonemes or subphonemes). You enter the labyrinth with a pocket containing slips of paper with Markov states written on them. At each junction you look at the topmost slip of paper to see which way you should take. As you walk through the labyrinth you pick up pieces of "probability" and words (pronounced by long sequences of Markov states) as your story fragments. When you exit you have translated the Markov states into a word sequence and accumulated an overall amount of probability for that word sequence. Since we don't know what the speaker actually said (that's why we're using a recognition engine), we pose the question as to which paths through the labyrinth garner the greatest amount of probability—the paths with the greatest likelihood will be our best guesses as to what the speaker said.

Searching FSTs for the best paths is well known to those skilled in the art and has been outlined (although not fully described) herein for a complete understanding of the technology of the present application. Additional detail may be found at, for example, the open source library OpenFst which provides a utility "fstshortestpath" to calculate the N-best paths (N is a number you can provide) through an FST. Note that the choice of name "fstshortestpath" reflects one application of FSTs where the weights accumulated along a path can be thought of as distances—imagine trying to find the shortest route between a starting point and a destination (e.g. the shortest route through the labyrinth), a service offered by mapping applications. Finding "shortest paths" includes techniques such as "beam" searches, which prune unpromising paths, and attempt to stay close (within the "beam") to the anticipated best path. The process of finding the most likely word sequences is called "decoding". After decoding there may be a second step to take the N-best word sequences from the decoder and rescore them using additional information to arrive at a better estimate of the words the speaker said.

Rescoring (sometimes called a second pass above) can also be performed using an FST that maps input sequences of words to output sequences (of the same words) plus their probabilities according to a designated language model. A convenient way to accomplish this is to take the output from the decoder in the form of an FST representing a lattice (collection) of N-best word sequences, remove existing language model scores (typically supplied by a low order statistical language model where the "order" of a statistical language model is the length (number of words) of the longest n-gram word sequences included in the language model), and compose it with an FST which has been built from a high order statistical language model to generate new, hopefully improved, scores. Conceptually, this is equivalent to the following composition:

$$\text{Lattice}_{Final} = \text{Lattice}_{Decoder}.\text{fst} \cdot G_{LowOrder}^{-1}.\text{fst} \cdot G_{HighOrder}.\text{fst}$$

The N-best lattice is composed first with the inverse of the low order language model $G_{LowOrder}$.fst (used to prepare the HCLG.fst) and then composed with the high order language model $G_{HighOrder}$.fst. The actual computation may differ in details, but is equivalent to the above. The G.fst for recollection relates to the translation from words to word-sequences with an overall likelihood by the language model.

A note on the implementation of rescoring discussed in the above paragraph: From a computer programming perspective it is easier to implement the composition with $G_{LowOrder}^{-1}$.fst indirectly. The probabilities on the arcs inside the Lattice$_{Decoder}$.fst are a combination of the probabilities from the H.fst and the $G_{LowOrder}$.fst, and for convenience are stored as their log values, since it is computationally more efficient to "add log probabilities" than "multiply real probabilities". Adding log probabilities together is mathematically equivalent to multiplying real probabilities. Thus, if you negate the (log) probability values and then compose with $G_{LowOrder}$.fst you will cancel out the $G_{LowOrder}$.fst component of the probabilities and be left with the negative (log) probabilities from the H.fst. Now negate the surviving probabilities which leaves behind the (positive) log probabilities from the H.fst, and you can now compose with the $G_{HighOrder}$.fst so that the Lattice contains probabilities which are a combination of H.fst and $G_{HighOrder}$.fst, but no longer any from $G_{LowOrder}$.fst, which is what we want from rescoring. For recollection, H.fst comprises the translation from Markov states to context dependent phonemes as described above.

A summary of some objects that have introduced thus far:
1. HCLG$_{Decoder}$.fst—An FST which is used to perform the initial decoding and generates a lattice of possible transcripts;
2. Lattice.fst—An FST which represents the "N-best" most likely word sequences, together with their acoustic and language model probability;
3. $G_{LowOrder}$.fst—A low order language model FST which was used in preparing the HCLG$_{Decoder}$.fst;
4. $G_{HighOrder}$.fst—A high order language model FST (higher order than the one used to produce $G_{Loworder}$.fst)

We assume that they have been prepared using vocabulary and phraseology for a similarly situated group of users. In other words, the statistical language model is a general language model and not one specific to a single user (or limited group of users).

The goal of customization is to support the recognition of words and phrases from two different recognizers (decoders and rescorers as described herein, but in a generalized form any two different recognizers). The simplest example might be to extend a given recognizer to recognize one new word. At the other end of the spectrum would be a combination of two extensive recognizers, such as one for oncology with one for business e-mail. Without any loss of generality, we can frame up the usage scenario as a desire to combine a general purpose recognizer for a group of similarly situated users, with a user-specific recognizer which handles vocabulary and phraseology for a specific user (or a limited group of users), but not necessarily applicable or desirable for other users of the general purpose recognizer. As used herein a limited group of users would be more than a single user, but less than the total group of similarly situated users.

A person of ordinary skill in the art would now recognize on reading the disclosure that any user-specific scenario can be generalized to a group of similarly situated users who wish to use a general purpose recognizer combined with one specific to the group's needs. For convenience in the following discussion we refer to the general purpose recognizer with the word "topic" and the user specific recognizer with the word "user", in which case there is an HCLG$_{Topic}$.fst and an HCLG$_{User}$.fst. User, in certain aspects may be one user as well as the aforementioned limited group of users. The former can be used for the first-step decoding of the topic and the latter can be used for the first-step decoding of the user specific vocabulary/phrases. Similarly, the rescoring for the topic and user vocabulary/phrases can be carried out by a $G_{TopicHighOrder}$.fst and $G_{UserHighOrder}$.fst. The technology of the present application provides technological improvements to allow for the combination of the topic and user structures in a way which allows the recognition engine to recognize audio whose utterances draw freely upon (and intermingle) words and phrases from both the topic and the user specific words and phrases. Also, while generally described as combining two language models, the technology as described herein can combine more than two language models. Thus, the examples provided of a topic and user recognizers should be considered exemplary and not limiting.

There are practical constraints on how we combine topic and user recognizers. The primary one is the computational time to produce a combined recognizer. A general purpose recognizer may take hours of CPU time to create and require multiple gigabytes of storage and memory to run. Thus, it is not practical to create customized recognizers de novo for each user every time the user wishes to add a new word to the recognizer. Further, many users want real time recognition so that they see results coming back as they are speaking. This requires that the general purpose topic recognizer be combined with the user recognizer in real time: it will not be acceptable to force the user to wait while the system combines the topic and user recognizers when a user first accesses and speaks to a system.

The technology of the present application outlines two exemplary and novel approaches which allow topic and user recognizers to be combined rapidly and deliver a real-time user experience. We approach the problem from the perspective of how language models work and the consequences for FST based decoders and rescorers. The first approach leverages properties of "independent segments" while the second exploits "back-offs". Neither approach is inherently superior to the other, and for many scenarios they will produce similar levels of accuracy, however, there may be circumstances where a back-off approach is more desirable than a segment based one (or vice versa).

Independent Segment (Final State) Approach

A premise of language modeling is that speech may be divided into independent segments, usually sentences, with the caveat that the sentences be delineated in other ways than punctuation symbols. For example, we may wish to preserve word histories across punctuation and use paragraph boundaries to delineate independent segments. Thus, independent segments may be whole utterances, or lines, or complete paragraphs, or some other common sense division. Statistical language modeling considers the probabilities of words given their histories back to the beginning of the segment. Typically, the history is limited to sequences consisting of a small number of words (2, 3, 4, or 5), since longer histories lead to unwieldy (big) data structures. A segment is deemed to begin with "<s> $word_1$ $word_2$ . . ." where <s> is the beginning of segment token (it does not correspond to a written or spoken word), and end with " . . . $word_{n-1}$ $word_n$ </s>" where </s> is the end of segment token (it does not correspond to a written or spoken word). Since the topic and user language models are independent of each other, a dictation which includes both can be considered to have the following structure (bold and italic with underscore are used to distinguish between topic and user content):

"<s> $topicword_1$ . . . $topicword_n$</s> <s> $userword_1$ . . . $userword_n$</s> <s> $topicword_{n+1}$ . . . $topicword_{n+m}$ </s>"

In other words, the independence of topic and user words/phrases means that there are segment delimiters between sequences of topic and user words. Recognizing the segment delimiters provides an insight into an exemplary methodology to combine topic and user data structures.

When statistical language models are compiled into FSTs, the usual convention is that <s> corresponds to an epsilon transition from the "start" state to a state from which emerge arcs, one for each word which can occur at the beginning of a sentence, while </s> after a word makes that word's state "final". A state marked as "final" is an allowed exit point from the FST, and if there are more words to process, a final state allows us to start back at the beginning (the start state of the FST)—state 0, followed by an epsilon arc to the state from each all words that may begin a sentence leave. However, a state marked as final is not necessarily "final" sensus literalis, since there may be arcs leaving it to other states within the FST. This means that a recognition engine can consider two possibilities when tracing a path through a final state: (a) terminate the current segment and start a new one; (b) ignore the segment boundary and continue on to subsequent words in the same segment.

If we want to allow for someone to switch between the main topic and their user specific words/phrases at any location, then we should allow for a segment to end after any word; if we wish to be more restrictive then we would allow a segment to end after the appropriately identified words. If we ensure that the language models for both the topic and the user words/phrases allow </s> to occur after any word, with a configurable probability, then we will have exit points in both language models which will allow us to hop between them at arbitrary positions within a segment. With no loss of generality, we will use back-off (rather than interpolated) SLMs to illustrate the mechanism. One of ordinary skill in the art would now recognize that other mechanisms are possible, including the aforementioned interpolated mechanism.

SLM's are widely used in speech recognition systems. They come in two equivalent flavors: "interpolated" and "back-off" (one can be converted into the other). The back-off version has entries which comprise a sequence of words (called an n-gram) with a probability and an optional back-off weight. Conventionally, the probabilities and back-off weights are $log_{10}$ values. Each entry may be interpreted as (a) the probability of the last word in the n-gram occurring after the preceding (n−1)-word history; and (b) the probability allocated to all the unlisted descendants of the n-gram is the back-off weight.

SLMs can be written in a human readable form called the Advanced Research Projects Agency (hereinafter "ARPA") format, which lists the word sequences in order of their length: 1-grams followed by 2-grams, etc. Our process is to ensure that for every word used in the ARPA file there is an entry for "word </s>" in the bigram section. [Note that normal SLMs contain entries of the form "word </s>" only for those words which occur at the end of segments, which is a minority.] An FST created from this augmented SLM contains final states corresponding to these introduced bigrams. We want the probability (or weight) of these final states to be configurable so that in the normal course of recognition, we do not end sentences prematurely. We refer to these FSTs as $G_{Topic}$.fst and $G_{User}$.fst. When these are composed with the other FSTs to make decoders we get modified $HCLG_{Topic}$.fst and $HCLG_{User}$.fst with final states that are the "descendants" of the final states from the G.fst's. The G.fst for recollection relates to the translation from words to word-sequences with an overall likelihood by the language model.

Figure 3:
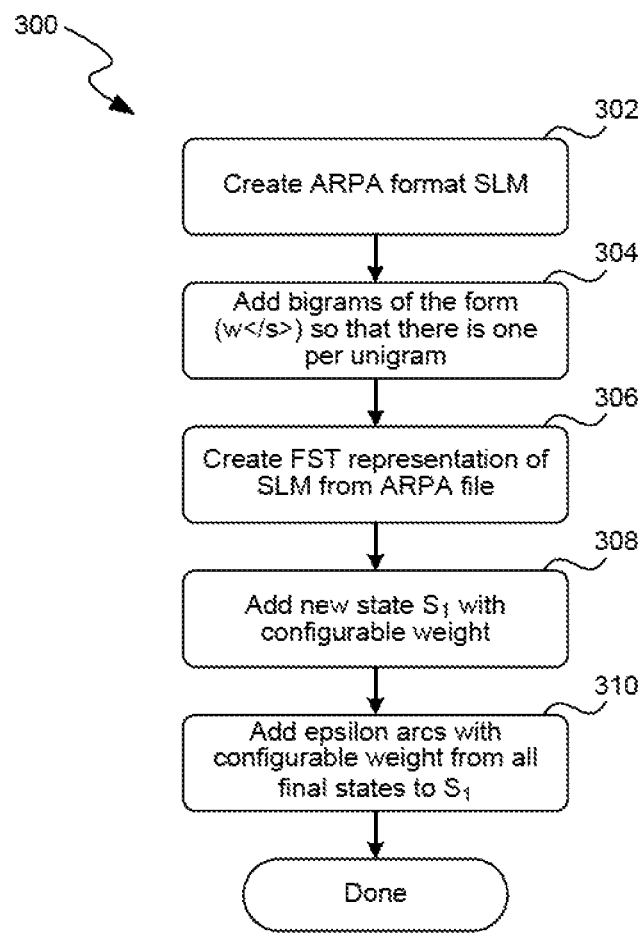
FIG. 3 is an illustrative flow chart of creating a statistical language model finite state transducer consistent with the technology of the present application.
Figure 7:
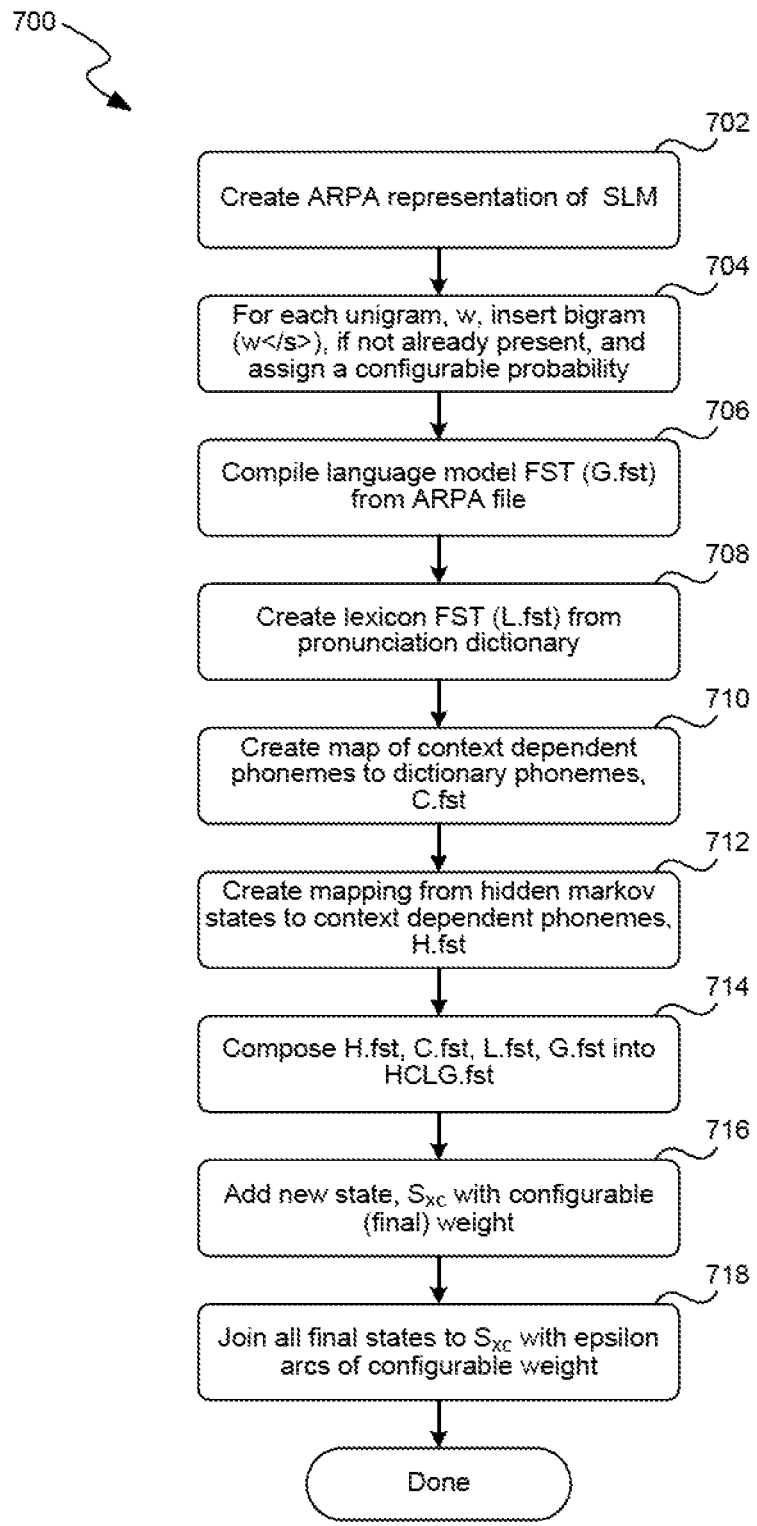
FIG. 7 is an illustrative flow chart of creating a final state for the joined statistical language model finite state transducers of FIG. 4.

This facilitates another novel modification: we add a new "über-final" state to the HCLG.fst and new zero-cost epsilon arcs from all the other final states to this new state, which we also give a weight of co (or some large number), so that the behavior of the modified HCLG.fst is identical to the unmodified HCLG.fst when used in isolation—the decoder will never include a path with ∞-cost in its N-best list. The ∞-cost will be adjusted later when we join the topic and user FSTs. We can make a similar modification to the G.fst's by adding a new state and epsilon arcs from existing final states to this new state. See FIG. 3 for a flow chart 300 of the construction of a G.fst with an über-final state, and FIG. 7 for a flow chart 700 of constructing an HCLG.fst from an ARPA language model and adding an über-final state. With specific reference to FIG. 3, a flow chart 300 showing an illustrative method of creating a G.fst having an über-final state is provided. The process begins by creating an ARPA format statistical language model, step 302. Next, bigrams of the form (word </s>) are added (or confirmed) in the SLM so that there is one bigram of the form (<w /s>) for each unigram, step 304. Once the bigrams are added, a FST representation of the SLM from the ARPA file is created, step 306. Next, a new state $S_f$ with a configurable weight is added to the FST, step 308. Finally, epsilon arcs with configurable weight from all final states to the $S_f$ are added to the created FSTs, step 310. With reference now to FIG. 7, a flow chart 700 showing an illustrative method of creating an HCLG.fst with an über-final state is provided. Similar to flow chart 300, the method begins by creating an ARPA representation statistical language model, step 702. Next, for each unigram in the SLM (in other words, every word (w) in the corpus, a bigram (w</s>) with a configurable probability (or cost) is inserted if not already present in the SLM), step 704. The SLM with the added bigrams is compiled as a language model FST (G.fst) from the ARPA file, step 706. Next, the lexicon FST (L.fst) is created from the pronunciation dictionary, step 708. A map is created of context dependent phonemes to dictionary phonemes, C.fst, step 710. A map is created to map hidden markov states to context dependent phonemes, H.fst, step 712. The H.fst, C.fst, L.fst, and G.fst are composed into HCLG.fst, step 714. New states $S_{xc}$ with configurable (final) weights are added, step 716. Finally, all final states of the HCLG.fst are joined to the $S_{xc}$ with epsilon arcs of configurable weight, step 718.

Figure 4:
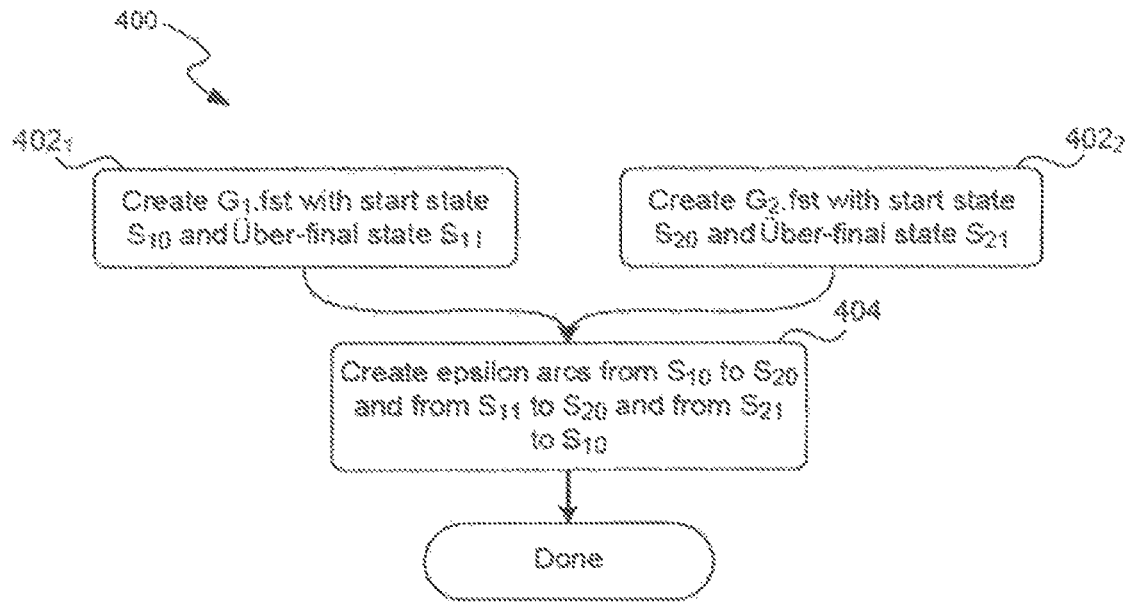
FIG. 4 is an illustrative flow chart of joining two statistical language model finite state transducers consistent with the technology of the present application.
Figure 8:
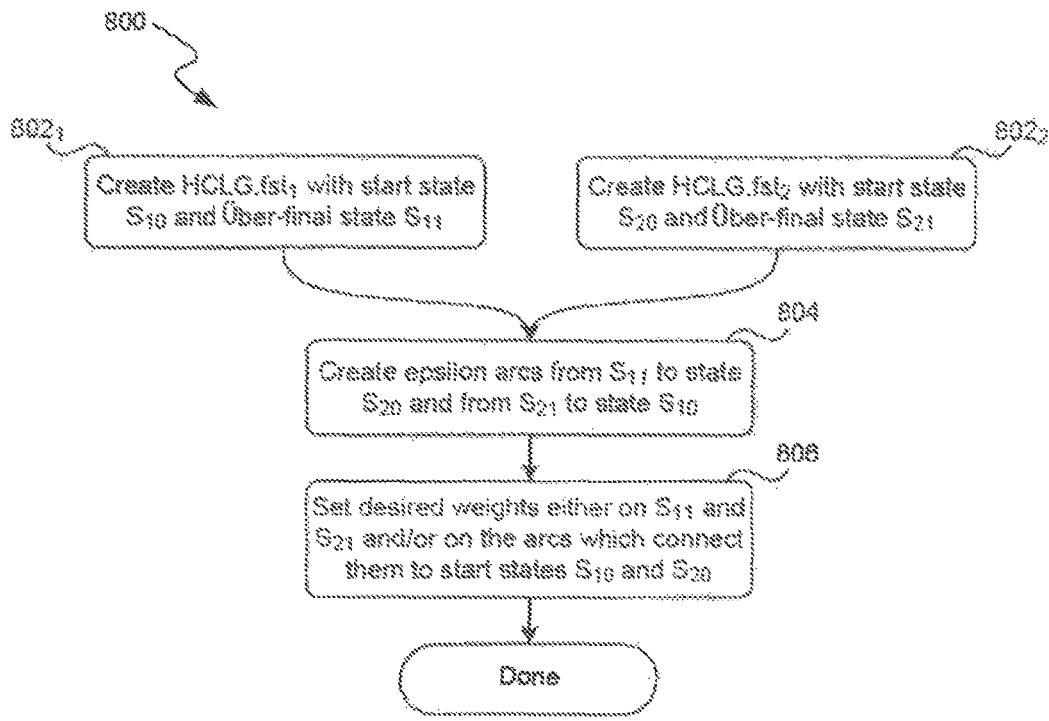
FIG. 8 is an illustrative flow chart of joining final states from FIG. 7.

Having added the über-final state, we combine the HCLG.fst's and G.fst's in a way which will allow both decoding and rescoring to produce word sequences which include words and phrases from both the topic and the user words/phrases. We combine the HCLG.fst's by creating epsilon arcs which connect the über-final state of one HCLG to the start state of the other HCLG and add weights on the arcs which represent the "cost" we want to impose for crossing from one recognition FST to the other. See FIG. 4 for a flow chart 400 of how to join two G.fst's and FIG. 8 for a flowchart 800 of how to join two HCLG.fst's with über-final states. With specific reference to FIG. 4, a flow chart 400 is provided of an illustrative method of joining G.fsts with über-final states. First, both a $G_1$.fst and a $G_2$.fst are created, step 402$_{1, 2}$. In this example, $G_1$.fst may be considered the topic and $G_2$.fst may be considered the user. The creation of the $G_1$.fst includes having start state $S_{10}$ and über-final state $S_{1f}$. The creation of the $G_2$.fst includes having start state $S_{20}$ and über-final state $S_{2f}$. Next, epsilon arcs from $S_{10}$ to $S_{20}$, from $S_{1f}$ to $S_{20}$, and from $S_{2f}$ to $S_{10}$ are created, step 404. Now with reference to FIG. 8, a flow chart 800 is provided of an illustrative method of joining HCLG.fsts with über-final state. First, both a HCLG.fst$_1$ and a HCLG.fst$_2$ are created, step 802$_{1, 2}$. In this example, HCLG.fst$_1$ may be considered the topic and HCLG.fst$_2$ may be considered the user. The creation of the HCLG.fst$_1$ includes having start state $S_{10}$ and über-final state $S_{1f}$. The creation of the HCLG.fst$_2$ includes having start state $S_{20}$ and über-final state $S_{2f}$. Next, epsilon arcs from $S_{1f}$ to $S_{20}$ and from $S_{2f}$ to $S_{10}$ are created, step 804. Predetermined (or desired) weights for the epsilon arcs are provided, step 806. The weights may be either on $S_{1f}$, $S_{2f}$ or on the arcs that connect $S_{1f}$, $S_{2f}$ to $S_{20}$, $S_{10}$, respectively.

When the decoder runs with the combined HCLG.fst (HCLG$_{Topic+User}$.fst), it will compare the cost (or probability) of word sequences which stay within the topic to ones which cross temporarily into the user domain. If the cross over is lower cost than any intra-topic path, we will see user words/phrases in the decoded text. This crossover technique also works for rescoring. If we combine $G_{TopicLowOrder}$.fst and $G_{UserLowOrder}$.fst as well as $G_{TopicHighOrder}$.fst and $G_{UserHighOrder}$.fst then we can use them as before in the rescore process. That is, we take the N-best lattice produced by HCLG$_{Topic+User}$.fst and compose it with $G_{Topic+UserLowOrder}^{-1}$.fst and $G_{Topic+UserHighOrder}$.fst, to get the rescored lattice from which we can chose the highest scoring word sequence as the recognition result.

Back-Off Approach

A basic concept in statistical language modeling is the notion of a "back-off". Let us consider a word history ($w_1$, $w_2$, $w_{n-1}$) and the word $w_n$ which can follow it. There will be some number of different instances of $w_n$ in the corpus used to calculate the language model and it is reasonable to assume that not all the possibilities which could occur in practice are actually present in the corpus, due to its finite size.

In the SLM (using the ARPA format) we list all the instances of ($w_1$, $w_2$, ... $w_{n-1}$, $w_n$) that occurred in the corpus together with their estimated probabilities as well as a "back-off weight" for ($w_1$ $w_2$ ... $w_{n-1}$) which is the amount of probability "left over" for unobserved words that can follow ($w_1$ $w_2$ ... $w_{n-1}$). For example, the sum of the probabilities of the ($w_1$ $w_2$ ... $w_{n-1}$ $w_n$) n-grams observed in the corpus plus the back-off weight of the ($w_1$ $w_2$ ... $w_{n-1}$) entry is equal to 1.0. There are a number of algorithms which estimate the probabilities and back-off weights from a corpus (e.g., Good-Turing, Kneser-Ney, Modified Kneser-Ney, Witten-Bell, amongst others), which are known to those skilled in the art, and will not be reproduced here. The convention in back-off SLM's is that the estimated probability of ($w_1$ $w_2$ ... $w_{n-1}$ $w_n$), which is not otherwise listed in the SLM, is the probability listed for the shorter sequence ($w_2$ ... $w_{n-1}$ $w_n$) times the back-off weight of ($w_1$ $w_2$ ... $w_{n-1}$). In other words, if we cannot find a listed probability for $w_n$ following the history ($w_1$ $w_2$ ... $w_{n-1}$) we look for a probability of $w_n$ following a shorter history ($w_2$ ... $w_{n-1}$) and multiply it by the back-off weight of ($w_1$ $w_2$ ... $w_{n-1}$). Backing off is recursive, and we can back off all the way to a zero length history, which by definition has a child state for every unigram and thus we must be able to find $w_n$ as child state.

Figure 5:
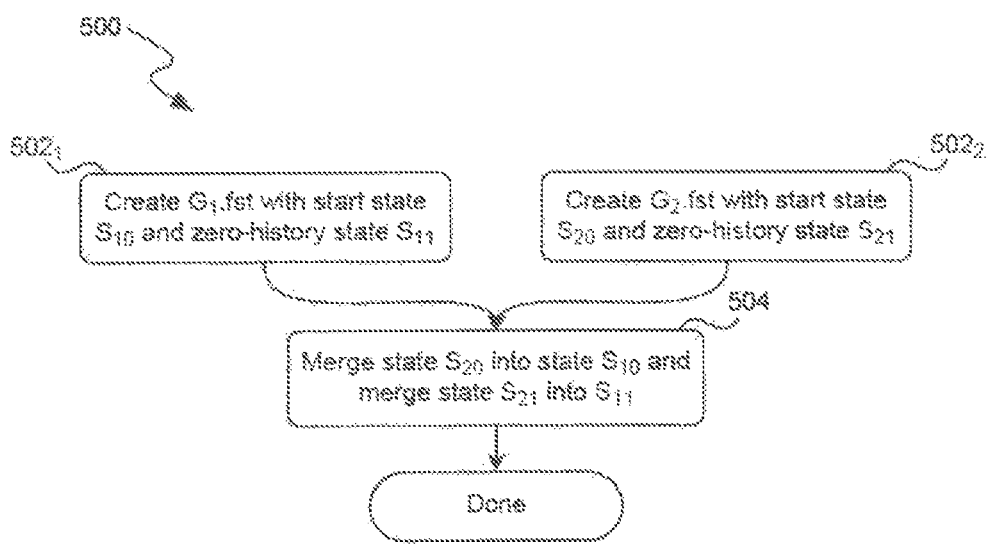
FIG. 5 is an illustrative flow chart of the backoffs for the joined statistical language model finite state transducers of FIG. 4.

If $w_n$ is a user-vocabulary word and we are looking in the topic's language model then we will not find a unigram entry for $w_n$, at which point we are stuck unless we create a bridge to the user language model. This is the essence of the back-off approach. We construct the G.fst's for both the topic and user-vocab so that they have a back-off state which acts as a zero-length history for all the unigrams. FIG. 5 provides a flow chart 500 of joining G.fsts for this methodology, which we define as an überbackoff state. If we create arcs between the two überbackoff states with some configurable weight, then the two language models can back-off into each other. The probability of a user-vocab word $\underline{w}_n$ following a history of topic words ($w_1$ $w_2$ ... $w_{n-1}$) is (in log probability terms):

$$P(w_1\ w_2\ \ldots\ w_{n-1}\ \underline{w_n}) = B(w_1 \ldots w_{n-1}) + B(w_2 \ldots w_{n-1}) + \ldots + B(w_{n-1}) + \text{CrossOverWeight} + P(\underline{w_n})$$

Where P( . . . ) refers to the probability and B( . . . ) to the back-off weight.

Similarly, there is a corresponding calculation when backing off out of the user's language model and crossing into the topic's. This is an easy enough construction in the G.fst's, but we also need to identify the corresponding überbackoff state (or states) in the HCLG.fst's that are derived from the G.fst's. As shown in FIG. 5, the process starts with creating $G_1$.fst and $G_2$.fst, step 502. The creation of $G_1$.fst includes having start state $S_{10}$ and zero-history state $S_{11}$. The creation of $G_2$.fst includes having start state $S_{20}$ and zero-history state $S_{21}$. Once created, the state $S_{20}$ is merged into state $S_{10}$ and the state $S_{21}$ is merged into the state $S_{11}$, step 504.

Figure 6:
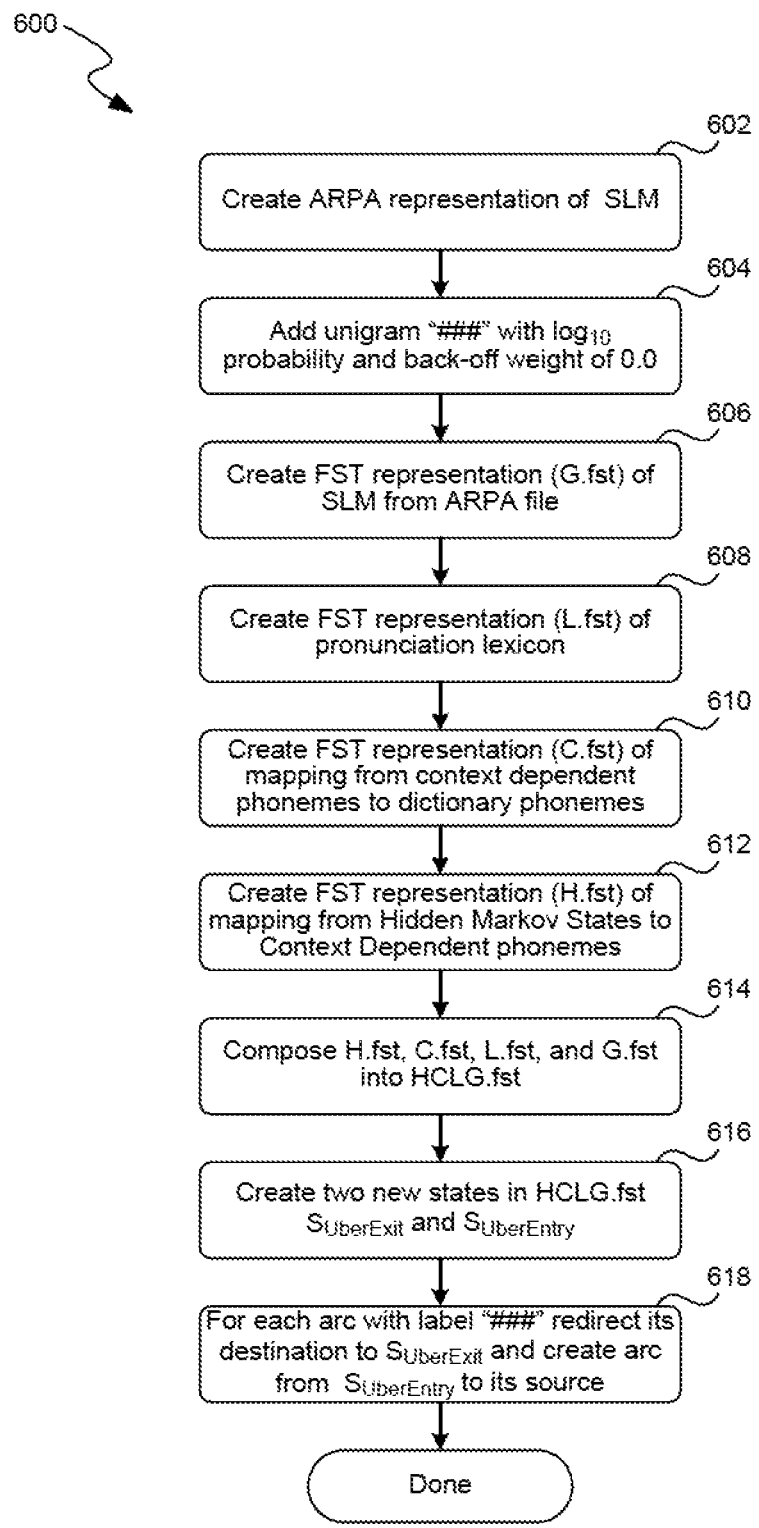
FIG. 6 is an illustrative flow chart of creating backoff exit and entry states for the joined statistical language model finite state transducers of FIG. 4.

One illustrative methodology for accomplishing this is provided in the flow chart 600 shown in FIG. 6. As shown in FIG. 6, the process begins with the creation of an ARPA representation SLM, step 602. Next, the process creates a special unigram in the SLM, which we will label "###", and assign it a $\log_{10}$ probability of 0.0 and backoff-weight of 0.0, step 604. The choice of symbol is arbitrary, our only constraint is that it is not a word in the vocabulary of the statistical language model. Part of creating the unigram in the SLM includes creating, in the lexicon, an entry for '###' with pronunciation of "SIL" (silence). Since '###' exists in the unigram section of the language model, and nowhere else, it will appear in the G.fst as an arc out of the zero-history state to an isolated state which has a single (back-off) arc back to the zero-history state—in other words an arc with label '###' is on a path which is both coming from and going to the zero-history state. Once the special unigram is created, the process continues by creating the G.fst, step 606, creating the L.fst, step 608, creating the C.fst, step 610, creating the H.fst, step 612, and composing the H.fst, C.fst, Lf.st, and G.fst into the HCLG.fst, step 614. The HCLG.fst is modified to include two (2) new states called $S_{überexit}$ and $S_{überentry}$, step 616. Finally, each arc with the label "###" is redirected to $S_{überexit}$ and an arc is created from $S_{überentry}$ to its source, step 618. In other words, we leverage this property in the HCLG.fst: any path containing an arc with label '###' must have backed off through the zero-history state, even if we cannot find such a state in the HCLG.fst—the operations which create the HCLG.fst smear out the zero-history state, so there is no longer a readily identifiable unique state which is the descendant of the zero-history state in the G.fst.

In this exemplary embodiment, we locate all the arcs with label '###' and perform the following 'snip and join' operation: we create two new states in the HCLG.fst, the über-exit and über-entry states (step 616 above), and create epsilon arcs from the source states of the '###' arcs to the überexit state, and similarly epsilon arcs from the überentry state to the destination states of the '###' arcs; finally, we delete the '###' arcs (step 618 above).

Figure 9:
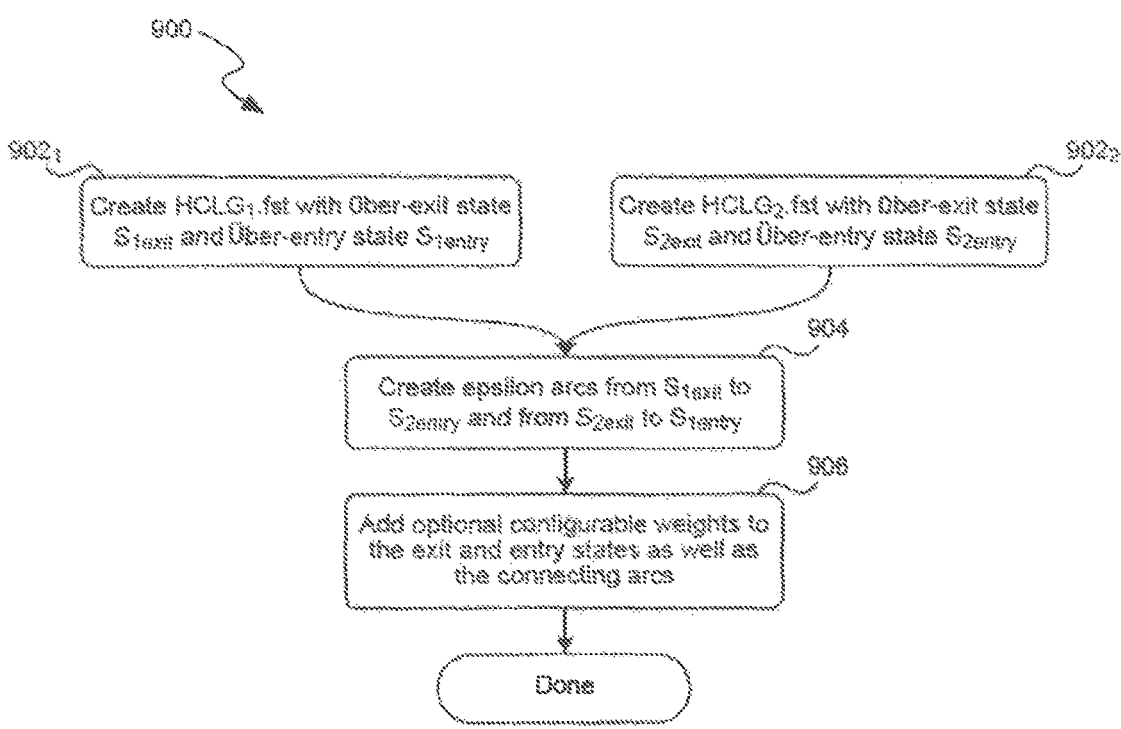
FIG. 9 is an illustrative flow chart of joining exit and entry states of FIGS. 6 and 7.

FIG. 9 provides a flow chart 900 for steps 616 and 618. First, in both the topic and user $HCLG_{1,2}$.fst's, respectively, are created, steps 902$_{1,2}$. The creation of the $HCLG_{1,2}$.fst's includes having $S_{1exit,2exit}$ for the überexit state and $S_{1entry,2entry}$ for the überentry state. Next, cross-connect arcs are created between the überexit state in one HCLG.fst to the überentry state in the other HCLG.fst, step 904. The creation of these cross-connect arcs means that we have a combined HCLG.fst which can recognize words and phrases from both $HCLG_{Topic}$.fst and $HCLG_{User}$.fst. If we wish to use higher order language models to rescore N-best lattices from the decoder, we can easily create combined $G_{LowOrder}$.fst and $G_{HighOrder}$.fst: simply merge the low order topic and user language models, delete the '###' entries, and compile into a $G_{LowOrder\text{-}Topic+User}$.fst, and similarly create a $G_{HighOrder\text{-}Topic+User}$.fst, which can be composed with the $Lattice_{Decoder}$.fst as described above. Optionally, predetermined (desired) weights can be added as described above, step 906.

Alternatively, we can just merge the start states and the zero-history states of the two G.fst's. For sake of clarity, we treat the two language models as having separate vocabularies, so that if the topic and user language models happen to share words in common, we actually treat them as two different sets of words and do not try to reconcile probabilities and back-offs for common words/phrases. One of ordinary skill in the art may consider such options to modify the above on reading the present disclosure.

Both the segment and back-off based approaches to combining decoders and language models involve cross-over arcs which allow the recognition machinery to explore paths which cross between topic and user spaces, and both approaches have similar accuracy. If we trace the same word sequence path in both approaches, the probabilities of the paths are the same if the path stays entirely within one of the FSTs. If the path crosses from one FST to another then the difference in probability between the approaches is accounted for by the difference in language model probabilities between ending and beginning a segment vs. backing off to zero-history. The probability differences are typically minor and do not have much impact on the recognizer's choice of preferred word sequences and hence recognitions results.

Similar Approaches to Independent Segments and Back-Offs

The two approaches just described are exemplars of the general concept, whereby we combine two FST's by creating appropriate supplementary states and arcs between them, such that we can create paths which are of the following form: (a) they lie (essentially) entirely within one or the other FST; (b) they consist of sequential segments which lie (essentially) within one or the other FST. It is possible to create trivial variations on a theme by adding any number of arcs and states, or indeed deleting non-contributing arcs and states without deviating from the spirit and scope of the technology of the present application as outlined in the claims.

Computational Considerations

The decoder HCLG.fst for a general purpose topic may take many hours of CPU time to create, and, as noted above, it is not practical to create HCLG.fst's de novo for each user. However, the computational cost to create cross-connect arcs between two previously built HCLG.fst's is modest, and indeed can be performed in real-time. In other words, when a user accesses the system for the first time and starts speaking, it is possible to join the two HCLG.fst's (as well as the rescoring FST's) and start returning recognition results without the user experiencing a noticeable delay. To be more explicit, we connect $HCLG_{Topic}$.fst and $HCLG_{User}$.fst, $G_{TopicLowOrder}$.fst and $G_{UserLowOrder}$.fst, $G_{TopicHighOrder}$.fst and $G_{UserHighOrder}$.fst as described herein

SUMMARY

Recognition systems which use FST's to represent statistical language models and decoders can be customized to support the combination of general purpose recognizers with user specific recognizers using the technology of the present application where topic and user decoder/rescore FST's may be combined using cross-over arcs between über-final or überbackoff states within the FSTs. The time taken to connect the G.fst's and HCLG.fst's (for two pass recognition involving an initial decoding and subsequent rescore step) is quick enough for a real time user experience. Generally, as used herein real time means a response with an acceptable accuracy is returned within a short time frame of no more than 3-8 seconds, but may be significantly less than 3-8 seconds, such as, for example, 300 microseconds or the like. In certain aspects, real time or near real time may include longer time frames or inserted time delay for particular reasons.

How to Represent SLMs as FSTs

This section provides an overview of prior art on how to create Finite State Transducer (FST) representations of Statistical Language Models (SLMs) using back-off representations (we will not present the equivalent interpolated approach), but such an approach would not be within the skill of the art on reading the present disclosure.

There is a standard file format for back-off SLMs called an ARPA file (where ARPA=Advanced Research Projects Agency as identified above). The file format consists of a header with summary information followed by N sections where each section contains probabilities and back-off weights for a collection of n-grams, where n=1, 2, . . . , N, and N is the order of the SLM. An n-gram is a sequence of n words. Its probability represents the probability of the last word in the n-gram appearing after the previous (n−1) words. The probabilities of n-grams are calculated from a statistical analysis of a given corpus of text. The n-gram sections have a property that if there is an entry for an n-gram ($w_1 w_2 \ldots w_n$), there will also be an entry for its parent ($w_1 w_2 \ldots w_{n-1}$) in the (n−1)-gram section.

Each entry has a probability, recorded as a $\log_{10}$ value. There may be a value listed for the back-off weight if it is non-zero (by convention omitted values are interpreted as '0.0'), the back-off weight can be interpreted as the probability reserved for unlisted child n-grams; it is also a $\log_{10}$ value. A simple way to build an FST which represents an SLM, is to create a state '0' and mark it as the "start state". State 0 is joined to a collection of states which represent the words which can occur at the beginning of segments. These words occur in the SLM as bigram entries of the form '<s> word', where <s> is a token that stands for "start of segment"; note that there is a corresponding symbol </s> which denotes "end of segment". The arcs to these states have input/output labels which are the words themselves, and probabilities taken from their '<s> word' bigram entries in the SLM. We also create a state '1' (not connected to state '0') and join it to a set of child states which represent all the unigrams in the language model. The arcs which connect state 1 to its child states have input/output labels which are the respective unigrams, and weights on the arcs, which are the unigram probabilities.

After creating states 0, 1, and their children, we create all subsequent states and arcs as follows. Each state in the FST represents a word sequence, or history, in the SLM. From each history we create states for its children and create arcs from the history state to each child state, the arcs have input/output labels which are the child words, and weights which are taken from the SLM and are the probabilities of the child words occurring after the given history. The end of segment symbol </s> is a special case.

Rather than creating a state and an arc to it, we simply assign a weight to the current history state; the weight is equal to the probability of </s> following the current word history. States with assigned weights are called "final" states. To handle back-offs, each history state has an epsilon back-off arc to a shorter-by-one history state, the weight of this arc is the back-off weight taken from the SLM; the "shorter-by-one" history, is the word sequence where the first word of the history is omitted. Note that state 1 is the zero-history state, or maximal back-off state. Given a sequence of input labels we walk from state to state by inspecting the arcs leaving the current state and looking for one which matches the current input label. If we cannot find such an arc we follow the back-off arc to the shorter-by-one history state and repeat the search; in the event that we follow back-off arcs all the way back to the zero-history state, we are guaranteed that there will be an arc to a matching child state, since the zero history state has exit arcs for every unigram. See FIG. 1 for diagrammatic representation of this exemplary method. State 0 is the start state for the FST, step 102, and we have illustrated two exemplary paths coming out of state 0. The upper path shows the an n-gram ($w_1$, $w_2$, $w_3$) tracing a path from state 0 to states 2, step 104, 3, step 106, and 4, step 108, and then its children, step 110, or descendant, n-grams which are shown as arcs labeled by $C_1$ to $C_4$. The lower path illustrates the back-off arc to the state which represents the back-off bigram ($w_2$, $w_3$), step 112, to state 10. The lower path shows the n-gram ($w_2$, $w_3$) tracing a path from state 0 to states 9, step 114, and 10, step 112 Beneath this excerpt we show another excerpt where state 1 is accessed by back-off arcs from un-shown states, step 116, and has arcs leaving it which are a sample of all the unigrams in the language model, step 118. State 1 represents the "zero history" n-gram, which is the back-off state of last resort. A flow chart for the construction on this FST is given in FIG. 2.

Figure 2:
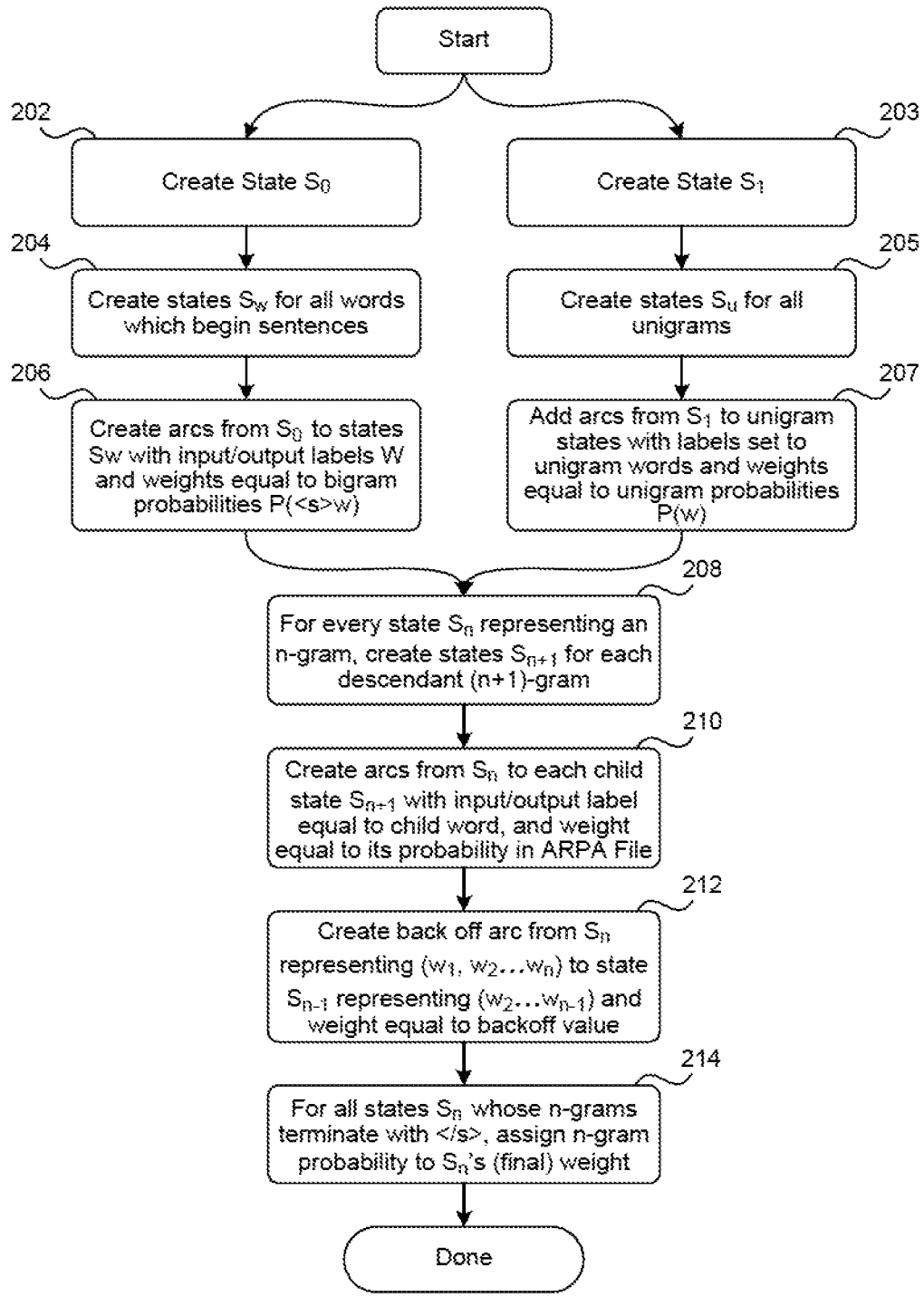
FIG. 2 is an illustrative flow chart of creating a finite state transducer representation of a statistical language model consistent with the technology of the present application.

With specific reference to FIG. 2, an exemplary flowchart 200 is provided of creating a G.fst from an ARPA representation of an SLM. The process starts by creating state $S_0$, step 202, and creating states $S_w$ for each word that may begin a sentence in the SLM, step 204. Next, arcs are created from $S_0$ to $S_w$ with input/output labels "w" and weights equal to bigram probabilities, step 206. In other words, the probably of <s> w (or the start word followed by the word). In parallel, before, or after, state $S_1$ is created, step 203, and states $S_u$ are created from each unigram, step 205. Next arcs from $S_1$ to unigram states with labels set to unigram words and weights equal to the unigram probabilities are created, step 207. Next, at step 208, for every state $S_n$ representing an n-gram (n-grams as defined above), states $S_n$ are created for each descendant (n+1)-gram. Next, arcs from $S_n$ to each child state $S_{n+1}$ with input/output label equal to child word, and weight equal to its probability in ARPA file are created, step 210. Backoff arcs from state $S_n$ representing ($w_1$, $w_2$, $w_3$, . . . $w_n$) to state $S_{n+1}$ representing ($w_2$, . . . $w_{n-1}$) and weight equal to the backoff values are created as required, step 212. Finally, for all states $S_n$ whose n-grams terminate with </s>, assign n-gram probabilities to $S_n$'s (final) weight, step 214.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method performed on one or more processors of speech recognition using finite state transducers comprising
providing a statistical language model usable by a continuous speech recognition engine;
creating an augmented statistical language model by inserting for every word in an advanced research projects agency file an entry of an end of segment bigram;
compiling a HCLG finite state transducer using the augmented statistical language model, wherein the HCLG finite state transducer is a compilation of a H.fst, C.fst, L.fst, and G.fst;
generating a modified HCLG finite state transducer by adding a first über-final state to the HCLG finite state transducer and configuring a weight for the first über-final state; and
joining all final states of the modified HCLG finite state transducer to the first über-final state by epsilon arcs and configuring weights of the epsilon arcs forming a first final HCLG finite state transducer.

2. The method of claim 1 further comprising forming a second final HCLG finite state transducer wherein forming the second final HCLG finite state includes adding a second über-final state, configuring a weight for the second über-final state, and joining all final states to the second über-final state by epsilon arcs and configuring weights of the epsilon arcs.

3. The method of claim 2 further comprising:
creating a first start state and a second start state;
linking the first über-final state to the second start state by an epsilon arc and linking second über-final state to the first start state by an epsilon arc.

4. The method of claim 1 further comprising generating a rescoring finite state transducer.

5. The method of claim 4 wherein the rescoring finite state transducer is a composition of a $G_{LowOrder}$.fst and a $G_{HighOrder}$.fst.

6. The method of claim 5 wherein the rescoring outputs a Lattice.fst indicative of a plurality of best word sequences with a corresponding plurality of probabilities associated with each of the plurality of best word sequences.

7. A method performed on one or more processors of merging speech recognition finite state transducers comprising
providing a statistical language model usable by a continuous speech recognition engine;
creating a special unigram having a probability of zero and a backoff-weight of zero and adding the special unigram to the statistical language model;
compiling a first HCLG finite state transducer using the statistical language model with the special unigram, wherein the first HCLG finite state transducer is a compilation of a H.fst, C.fst, L.fst, and G.fst;
generating a first modified HCLG finite state transducer by adding a first über-entry state and a first über-exit state to the HCLG finite state transducer;
redirect each arc with the special unigram to the first über-exit state; and
creating arcs from the first über-entry state to its source to form a first final HCLG finite state transducer.

8. The method of claim 7 further comprising forming a second final HCLG finite state transducer wherein forming the second final HCLG finite state includes adding a second über-entry state, a second über-exit state, redirecting each arc with the special unigram to the second über-exit state and creating arcs from the second über-entry state to its source.

9. The method of claim 8 further comprising joining the first final HCLG finite state transducer and the second final HCLG finite state transducer comprising:
creating epsilon arcs from the first über-exit state to the second über-entry state and from the second über-exit to the first über-entry.

10. The method of claim 9 further comprising adding weights to the first and second über-entry states and the first and second über-exit states.

11. A method performed on one or more processors of speech recognition using finite state transducers to efficiently combine at least a first statistical language model and a second statistical language model that is different than the first statistical language model comprising:
providing the first statistical language model usable by the continuous speech recognition engine and the second statistical language model different from the first statistical language model usable by the continuous speech recognition;
creating a first augmented statistical language model by inserting for every unigram in the first statistical language model an end of segment bigram and a second augmented statistical language model by inserting for every unigram in the second statistical language model an end of segment bigram;
compiling a first finite state transducer using the augmented first statistical language model and a second finite state transducer using the augmented second statistical language model;
generating a modified first finite state transducer by adding a first über-final state to the first finite state transducer and configuring a first weight for the first über-final state and a modified second finite state transducer by adding a second über-final state to the second finite state transducer and configuring a second weight for the second über-final state;
joining all final states of the modified first finite state transducer to the first über-final state by epsilon arcs and configuring weights of the epsilon arcs forming a first final finite state transducer and all final states of the modified second finite state transducer to the second über-final state by epsilon arcs and configuring weights of the epsilon arcs forming a second final finite state transducer;
creating a first start state and a second start state; and
linking the first über-final state to the second start state by an epsilon arc and linking second über-final state to the first start state by an epsilon arc,
wherein the continuous speech recognition engine recognizes words in the augmented first statistical language model and the augmented second statistical language model.

12. The method of claim 11 wherein at least one of the first statistical language model or the second statistical language model is usable by a first group of users and the other of the first statistical language model or the second statistical language model is usable by a second group of users where the second group of users is a subset of the first group of users.

13. The method of claim 12 wherein the first finite state transducer is a compilation of a H.fst, C.fst, L.fst, and G.fst and wherein the second finite state transducer is a compilation of a H.fst, C.fst, L.fst, and G.fst.

14. The method of claim 12 wherein the first finite state transducer is a G.fst and the second finite state transducer is a G.fst.

15. The method of claim 12 wherein the second group of users is smaller than the first group of users.

16. The method of claim 15 wherein the second group of users comprises a single user.

17. A method of recognizing speech using a first and second statistical model comprising:
- receiving at a recognition engine a signal indicative of spoken audio;
- recognizing by the recognition engine words corresponding to the signal using a combination of a first finite state transducer and a second finite state transducer, wherein the second finite state transducer is separate from the first finite state transducer;
- rescoring by the recognition engine the words using a third finite state transducer and a fourth finite state transducer; and
- outputting a sequence of words wherein the words correspond to at least one of a topic statistical language model and a user statistical language model.

18. The method of claim 17 wherein the first finite state transducer is a composition of a H.fst, C.fst, L.fst, and G.fst and wherein the second finite state transducer is a compilation of a H.fst, C.fst, L.fst, and G.fst.

19. The method of claim 18 wherein the third finite state transducer is a composition of a $G_{firstLowOrder}$.fst and a $G_{firstHighOrder}$.fst and wherein the fourth finite state transducer is a composition of a $G_{secondLowOrder}$.fst and a $G_{secondHighOrder}$.fst.

* * * * *